United States Patent

Ibrahim et al.

[11] Patent Number: 5,322,670
[45] Date of Patent: Jun. 21, 1994

[54] PRODUCT RECOVERY TUBE ASSEMBLY

[75] Inventors: Jameel Ibrahim, Humble, Tex.; Robert E. Farritor, Baton Rouge, La.

[73] Assignee: Ethyl Corporation, Richmond, Va.

[21] Appl. No.: 963,814

[22] Filed: Oct. 20, 1992

[51] Int. Cl.⁵ .................. F27B 15/09; F27B 15/10; B01J 8/44
[52] U.S. Cl. .................. 422/145; 34/168; 285/49; 285/223
[58] Field of Search .......... 422/145, 143, 146, 139, 422/310; 34/168, 57 R, 57 A; 285/330, 49, 223

[56] References Cited

U.S. PATENT DOCUMENTS

| | | | |
|---|---|---|---|
| 2,195,492 | 4/1940 | McDonald | 285/330 |
| 2,830,911 | 4/1958 | Fogelberg | 34/168 |
| 3,168,334 | 2/1965 | Johnson | 285/223 X |
| 5,082,634 | 1/1992 | Raufast | 34/57 A X |
| 5,202,099 | 4/1993 | Boone et al. | 34/57 A X |

Primary Examiner—Robert J. Warden
Assistant Examiner—Amalia Santigo
Attorney, Agent, or Firm—Edgar E. Spielman, Jr.; Patricia J. Hogan

[57] ABSTRACT

A product withdrawal tube for use in a fluidized bed reactor is disclosed. The tube features a plurality of elongated tubular segments which are fitted together to obtain flexible and sealing engagement between the segments whereby the tube is durable despite the vibrations and shocks experienced by it due to the operation of the fluidized bed reactor.

11 Claims, 2 Drawing Sheets

PRODUCT RECOVERY TUBE ASSEMBLY

BACKGROUND OF THE INVENTION

This invention relates to an improved product recovery tube for use in recovering polysilicon from a fluidized bed reactor. High purity monocrystalline silicon is in great demand as a semiconductor material. The purity of the silicon is critical as impurities, especially metal impurities, in amounts as small as a few parts per billion, can adversely alter the silicon's conductivity or electronic characteristics.

Most of the world's supply of semiconductor grade monocrystalline silicon is produced from polycrystalline silicon, i.e., polysilicon, which in turn is produced from the thermal decomposition of a silicon source, e.g., silane, monochlorosilane, and the like. The thermal decomposition can be efficiently carried out in a fluidized bed reactor which accepts, as a feed, a mix of a silicon source gas and a carrier gas. The silicon source gas decomposes to yield silicon which deposits on silicon seed particles which are maintained in a fluidized state. As deposition occurs, the seed particles grow until they are of the desired size. Removal of the grown particles from the fluidized bed reactor is accomplished by providing a product withdrawal tube which extends downwardly from the gas distributor in the reactor to a separate cooling vessel which holds a charge of previously withdrawn polysilicon. Gas is fed upwardly in the product withdrawal tube so as to fluidize at least a portion of the polysilicon which is present in the tube. The fluidization in the tube serves at least two important functions: (1) fluidization tends to minimize the tendency of the polysilicon particles to fuse one to the other in the presence of decomposing silicon source gas, and (2) since fluidization facilitates heat transfer, there is a smaller temperature difference between the polysilicon in the tube nearest the reactor and the polysilicon in the tube farthest from the reactor and, thus, there is a diminishment of thermal shock when the polysilicon is discharged from the tube.

To effect removal of the grown polysilicon from the fluidized bed reactor, the cooling vessel is periodically emptied of a portion of the polysilicon previously fed thereto. This emptying allows for the polysilicon in the product withdrawal tube and in the fluidized bed reactor to flow through the product withdrawal tube into the cooling vessel. After a measured amount of polysilicon has been so withdrawn, the emptying of the cooling vessel is stopped and, as a consequence, the flow through the product withdrawal tube is stopped.

All of this residence time in and movement through the product withdrawal tube would be of concern from a metals contamination standpoint if the product withdrawal tube were made of metal. The contamination specifications on high grade polysilicon allow for so little contamination that mere moving contact between polysilicon and a metal can be deleterious. This contamination problem can be obviated by constructing the product withdrawal tube from a silicon based material, say poly- or monocrystalline silicon, or by coating a substrate with polysilicon. In this way, the "contamination" is silicon contamination and is not harmful. While such provides a solution, it has been found that the solution is still short of the ideal.

It has been the practice to use a unitary polysilicon tube as the product withdrawal tube. These tubes were sealingly held in place against the gas distributor in the reactor by applying, at the bottom of the tube, a force parallel to the long axis of the tube and in a direction towards the distributor. In this way a good seal and tube support were obtained. However, these tubes were fragile owing to their silicon based construction, and fragile tubes are not favored when held in tight relationship with a gas distributor which is subject to the vibrations and shocks associated with fluidized bed processes. Unitary tubes generally have short lives due to breakage. Not only were the unitary tubes fragile, they also were expensive to construct owing to their considerable length, say 6 to 8 feet.

Therefore, there is a need for a product discharge tube which is non-contaminating to polysilicon and which has extended service life.

THE INVENTION

This invention relates to a non-unitary product withdrawal tube which is resistant to vibration and shock damage, is at least substantially gas-tight throughout its extent, and is non-contaminating to polysilicon.

The product withdrawal tube of this invention comprises a plurality of elongated tubular segments having crystalline silicon (mono- or polycrystalline) inner surfaces. The segments include an upper segment, a lower segment and, optionally, at least one intermediate segment, which segments are fittable one to the other to form the product withdrawal tube. The upper segment has one end configured to abut and form a seal with a fluidized bed distributor and having the other end configured for obtaining flexible and sealing engagement with one end of the adjacent lower segment or intermediate segment as the case may be. The lower segment has one end configured for receiving a force substantially parallel to its long axis and in a direction towards the fluidized bed distributor, and has the other end configured for obtaining flexible and sealing engagement with one end of the adjacent upper segment or, optional, intermediate segment.

By providing a segmented product withdrawal tube, the tube is allowed some movement in accommodating, without damage, the vibration and shocks previously mentioned. This is quite an accomplishment when it is considered that (1) the tube segments are made from monocrystalline silicon, which is a very brittle material, (2) the tube must be capable of supporting the use of a fluidizing gas in at least a portion of its length without substantial gas leakage though the tube joints, and (3) the extreme temperature difference between the top and bottom of the tube, e.g., between 100° C. and 600° C.

Monocrystalline silicon is the preferred material of construction for the segments, although materials such as silicon carbide coated with chemical vapor-deposited silicon or silicon carbide are also suitable. The monocrystalline silicon material is obtained by conventional means, such as by the Czochralski method or by the float zone method. The former method is predominant and features melting polysilicon in an appropriate crucible and dipping a seed crystal into the melt and then slowly withdrawing the seed vertically from the melt. A rod shaped single crystal is obtained which can be machined to provide the various segments.

Each segment should have a length which is not so short that the tube will have an ungainly number of segments and which is not so long that the segment will be overly fragile under the conditions of use. The segments need not all be of the same length, but there is some convenience in having segments of the same length. Generally, the segments will have a length which is within the range of from about 0.5 to about 5 feet. Preferred are segment lengths which are from about 1 to about 3 feet as such lengths are easy to produce and handle.

The product withdrawal tube of this invention will have an overall length sufficient to deliver the polysilicon from the fluidized bed reactor to the selected destination, e.g., a cooling vessel. It is desirable to keep the tube length as short as is practical since there is an economic savings with a short tube and since the shorter tubes will be able to better accommodate, in a straight line fashion, the compressive force on the tube which is applied via the above mentioned force on the bottom segment. The impetus for short tubes is, however, somewhat offset by the need to keep a significant distance between the hot fluidized bed reactor and the generally cooler final destination. All things considered, in most applications, the tube will have a total length within the range of from about 2 to about 10 feet and most preferably within the range of from about 4 to about 8 feet.

The number of segments used will depend upon the length of the tube and the segment lengths. It is generally preferred that there be no more than about 12 intermediate segments per tube as the use of more segments means a higher number of flexible seals which can lead to excessive gas seepage. For a tube having a length within the range of from about 5 to about 8 feet, a preferred number of segments will be within the range of from about 3 to about 6.

The inside diameter of the tube should be that which will easily handle the anticipated flow of polysilicon. For most fluidized bed reactors, an inside diameter within the range of from about ¾ to about 3 inches is suitable. Larger or smaller inside diameters can be used, there being no criticality as to the inside diameter for the tube of this invention.

The wall thickness of the segments, and thus the tube, can be any of which will not deleteriously effect the tube function. Wall thicknesses within the range of from about ¼ to about 1½ inches will generally be found to be satisfactory.

As mentioned previously, the upper segment abuts and forms a seal with the fluidized bed distributor at one of its ends. The abutment and seal are maintained via the compressive force applied to the tube substantially parallel to its long axis. The seal is formed by the disposition of silicon in the interstitial space between the sealing surfaces of the tube and the distributor. The system used for obtaining the seal is not critical to this invention provided that it facilitates the use of the compressive force to hold the segments into engagement one with the other to form the product discharge tube. The terminology that the compressive force is applied to the tube substantially parallel to the tube's long axis is meant to cover any compressive force which tends to hold the string of segments together to from the tube and which is generally in the direction running from the bottom of the tube to the top of the tube. Generally, this compressive force will be applied via the tube walls.

The compressive force can be applied in any conventional manner for applying such forces, provided that the method used allows for thermal expansion of the tube and does not result in tube segment damage despite the rigors of process vibration and shocks. A fairly inexpensive and effective method comprises applying the compressive force by the use of coil springs which are adjustably compressed and in association with the lower end of the bottom segment thereby urging the bottom segment, and thus all the segments, towards the fluidized bed distributor. By using a spring, much of the process vibration is dampened and much of the impact from process shock is compensated for by spring action. While coil springs are preferred, other spring types may be used, e.g., leaf springs and the like. Also the springs need not only be positioned to act in compression but they also may be used in tension to apply the compressive force. Other non-spring methods which provide the above benefits can be used. Irrespective of the method for applying the compressive force, the force must be sufficient to accomplish the purposes of maintaining the structural integrity of the tube and maintaining the various seals associated with the tube. Generally, loading forces on the order of from about 300 to about 800 pounds are suitable.

Each end of each intermediate segment, the bottom end of the upper segment and the top end of the lower segment are configured to provide a flexible seal between it and the mating end of the adjacent segment. Since the machining of mono-crystalline silicon is an art, it is preferred that the configurations of these segment ends be as simple as is possible while still providing for a high quality flexible seal. It has been found that simplicity and effectiveness are both well served by configuring the segment ends so that they mate to form tongue and groove joints. The seal is perfected by using a gasket about the outer horizontal annular portion of the joint. The compressive force on the segment string keeps a sealing pressure on the gasket. With the gasket so located, there is little chance that the polysilicon flowing through the tube will come in contact with the gasket and be subjected to contamination as a result of such contact. The gasket material should be inert and have little or no volatiles content.

It is preferred that the product discharge tube of this invention be used in combination with a protective sleeve which is exterior of and substantially coaxial with the long axis of the tube. The sleeve should extend over at least a major portion of the length of the product withdrawal tube. The sleeve acts to protect the tube. The sleeve is preferably of a material which is relatively inert under the process conditions and which has good insulating qualities. Preferred is silicon carbide coated graphite. The inside diameter of the sleeve is slightly larger than the outside diameter of the tube. This difference in diameter leaves an annular gap between the tube and sleeve which is within the range of from about 1/32 to about ½ inch. It is preferred that the sleeve extend over at least 75% of the tube's length and most preferably that it extend over almost all if not all of the length.

BRIEF DESCRIPTION OF THE DRAWINGS

These and other features contributing to satisfaction in use and economy in manufacture will be more fully understood from the following description and drawings in which identical numbers refer to identical parts and in which:

Referring now to FIGS. 1-3, there can be seen a product withdrawal tube of this invention, which is generally designated by the numeral 10. Product withdrawal tube 10 is fitted to fluidized bed distributor 12. Fluidized bed distributor 12 is a conventional distributor utilized in fluidized bed reactors. Fluidized bed distributor 12 provides a plurality of discharge ports which are indicated by the numerals 14a-14d. These distributor discharge ports are dimensioned and located so as to provide the desired fluidized bed during the operation of the reactor. The fluidized bed distributor has, at its center, bore 16 into which nests the upper portion of upper segment 22 of product withdrawal tube 10. Bore 16 has a diameter which is slightly larger than the outside diameter of upper segment 22.

Upper segment 22 is in abutment and in sealing engagement with fluidized bed distributor 12 by way of the contact between tube shoulder 20 and distributor collar 18.

Figures 2, 3:
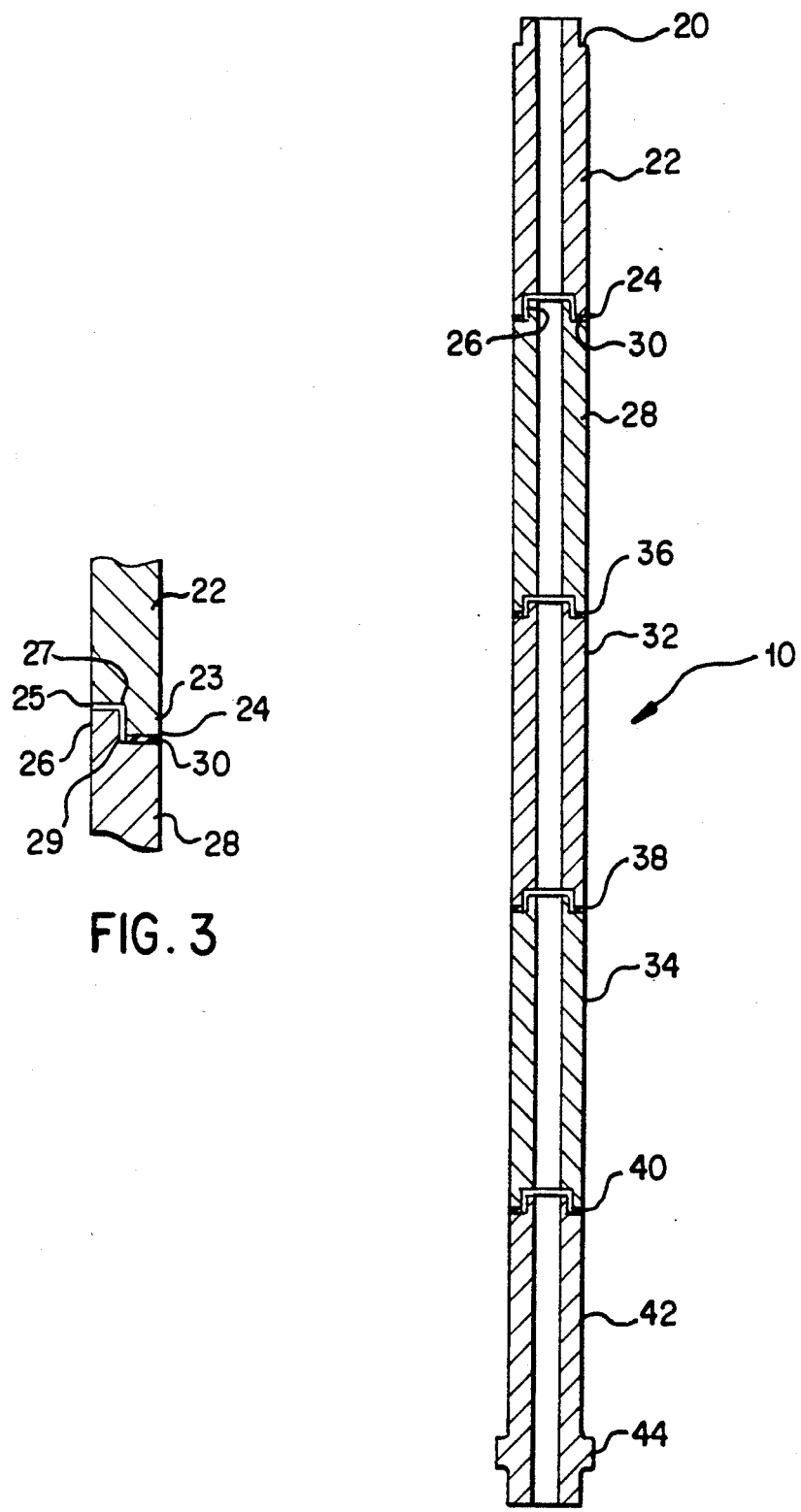
FIG. 2 is a cross sectional view of the product withdrawal tube depicted in FIG. 1.
FIG. 3 is an enlarged cross sectional view of one of the lap joints depicted in FIG. 2.

As can be seen in FIG. 2, product withdrawal tube 10 is comprised of several tube segments, i.e., upper segment 22, intermediate segments 28, 32 and 34 and bottom segment 42. The segments are connected one to the other by means of various tongue and groove joints. Tongue and groove joint 24 connects upper segment 22 to intermediate segment 28 which in turn is connected to intermediate segment 32 by means of tongue and groove joint 36. Tongue and groove joint segment 38 connects segments 32 and 34 while tongue and groove joint 40 connects segments 34 and 42. Each of these joints is similar in construction and is illustrated by the enlarged view in FIG. 3 of tongue and groove joint 24. Joint 24 is comprised of annular rim 26 which is at the uppermost end of intermediate segment 28 and outer annular rim 23 which is at the lower end of upper segment 22. These two rims cooperate one with the other to form a tongue and groove joint which is made substantially gas tight through the use of gasket 30 which cooperates with the joint as is seen in the figures. Tongue and groove joint 24 provides a small space 25 in the joints which allows for some movement in the joint without breaking of the seal provided by gasket 30. Space 25, over time, can become occupied by a fine silicon dust, etc. without destroying the efficacy of the joint. Due to the rather brittle nature of the material utilized to produce the segments, it is preferred that radii be provided for each portion of the joint which presents an edge or which presents an intersection of two surfaces. For example, a radius is provided at each of surface intersections 27 and 29. The use of edge and intersection radii will eliminate stress fracturing and will mitigate against the edges or corners of the joint from being damaged.

Figure 1:
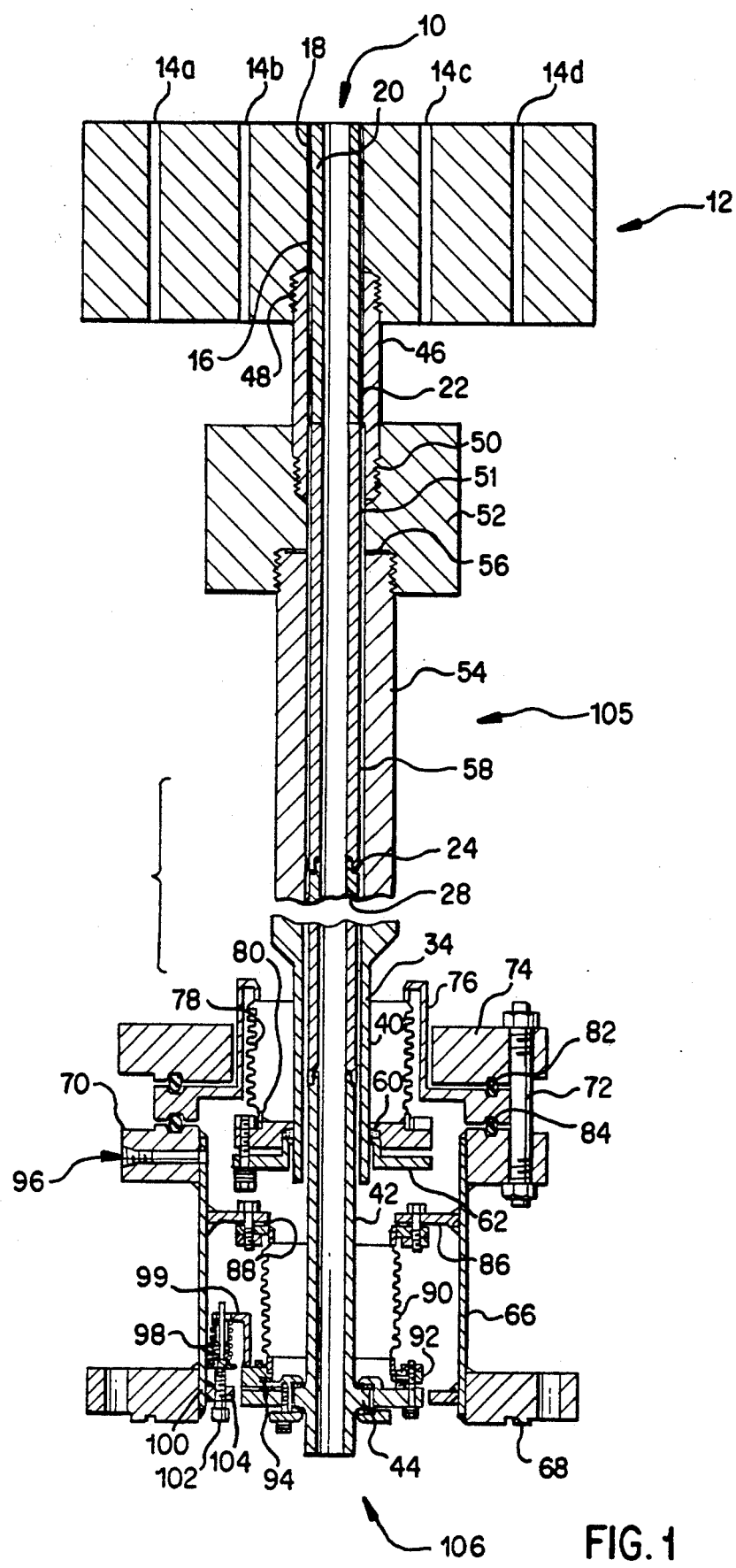
FIG. 1 is a cross sectional, partially broken away front elevational view of a product withdrawal tube of this invention in use with a fluidized bed distributor.

Bottom segment 42 has about its lowermost end collar 44 whose function will be described below. Surrounding a portion of upper segment 22 is upper sleeve portion 46. Upper sleeve portion 46 serves to protect segment 22 and to provide insulating properties. Upper sleeve portion 46 can be fabricated from graphite. Upper sleeve portion 46 is substantially coaxial with the long axis of upper segment 22. There is a gas tight relationship between fluidized bed distributor 12 and upper sleeve portion 46 which is accomplished by way of conventional inert and non-volatile packing material 48 as is seen in FIG. 1. Also, as can be seen in FIG. 1, upper sleeve portion 46 has an inside diameter which is slightly larger than the outside diameter of upper segment 22. The resultant annular space formed between these two diameters is in keeping with the annular space formed between bore 16 and the outside diameter of the uppermost portion of upper segment 22 which can also be seen in the drawings.

At its lowermost end, upper sleeve portion 46 is carried by carrier block 52 in a gas tight manner by means of conventional packing 50. Carrier block 52 has a bore 51 which is below packing 50 and which has a diameter greater than that of the outside diameter of upper segment 22. This difference in diameters provides for the continuation of the annular space mentioned above.

Carried by the lower portion of carrier block 52 is lower sleeve portion 54. Lower sleeve portion 54 is conveniently carried by carrier block 52 by means of threaded engagement. This engagement is made gas tight by means of gasket 56. As can be seen in FIG. 1, lower sleeve portion 54 is substantially coaxial with product withdrawal tube 10. Further, lower sleeve portion 54 has an inside diameter which is slightly larger than the outside diameter of those segments which it surrounds. The difference in diameters provides for continuation of the annular space discussed above. The entirety of this space, extending from the upper end of upper segment 22 down to the upper end of bottom segment 42 is conveniently referred to, collectively, as longitudinal annular space 58. Longitudinal annular space 58 contains any gases which should leak past packing 48 or packing 50.

As can be seen in FIG. 1, the lowermost extent of longitudinal annular space 58 is open. This opening will allow gases contained within this space to be in gaseous communication with another space from which they can be safely disposed.

To provide for this space, the embodiment shown in the drawings has an upper resilient bellows seal 78 and lower resilient bellows seal 90. Upper bellows seal is designed to move with the motion of lower sleeve portion 54 while lower resilient bellows seal 90 is designed to move with the motion of bottom segment 42. Both of these bellows seals are mounted, at their upper ends, to a foundation which is not subject to movement.

As can be seen in FIG. 1, upper resilient bellows seal 78 is mounted to upper bellows bracket 76 which in turn is bolted to annular wall 66 which is carried by baseplate 68. Baseplate 68 is affixed, directly or indirectly, to a solid foundation such as a concrete pad, etc. Upper bellows bracket 76 is connected to annular wall 66 by means of flanges 70 and 74 which are bolted one to the other by a plurality of nut and bolt combinations of the type designated by the numeral 72. Only one of these nut and bolt combinations is shown in the Figures, but it is to be understood that there are a plurality of such nut and bolt combinations which are conventionally located, with equiangular spacing, about the periphery of the two flanges. Upper bellows bracket 76 is annular and is substantially coaxial with the longitudinal axis of upper resilient bellows seal 78 which is also annular in shape. To prevent any gas escapement between flanges 70 and 74, there is provided gaskets 82 and 84 which are designed to provide gas tight seals.

The lower end of upper resilient bellows seal 78 is attached to bracket 80 which is welded to and carried by a gasket mounting assembly 62. Gasket mounting assembly 62, in addition to carrying bracket 80, functions to hold sleeve gasket 60 in rigid and gas tight fitment to the outside of lower sleeve portion 54 as is shown in FIG. 1. By having the gasket seal formed by sleeve gasket 60 and gasket mounting assembly 62 and by using the resilient upper bellows seal 78, a moveable gas tight seal is provided between the atmosphere 105 and the lower sleeve portion 54. Since the seal is able to move due to the flexibility of upper bellows seal 78, there is no compromise of the gas tight seal due to the motion of lower sleeve portion 54 caused by thermal expansion and contraction or by the vibrations and shocks resulting from the operation of the fluidized bed.

Like the lower end of lower sleeve portion 54, the lower portion of bottom segment 42 is sealed against gas leakage. Bottom tube portion 42 will also be in motion due to fluidized bed vibrations, thermal expansion or contraction, etc. Providing for such a moveable seal is lower bellows seal 90 which is attached at its upper end to lower bellows bracket 86. Lower bellows bracket 86 is, itself, sealed against gas leakage by means of gasket 88. Lower bellows seal 90 is substantially coaxial with bottom segment 42 and is annular in shape. Lower bellows seal 90 is attached at its bottom end in a gas tight manner by way of lower bellows bracket assembly 92 and gasket 94. As can be seen in FIG. 1, lower bellows bracket assembly 92 is fitted to, in a rigid manner, bottom segment 42 by way of engagement with bottom segment collar 44. This engagement is also sealed by way of gaskets against gas leakage.

The provision of the two bellows seals and the various gaskets and assemblies provides for a gas tight chamber which is capable of containing gases from longitudinal annular space 58. The chamber comprises the space between upper resilient bellows seal 78 and the interior walls of upper bellows bracket 76. The bottom portion of the chamber is between the outside surface of bottom segment 42 and lower bellows seal 90. The bottom of the chamber is sealed by lower bellows bracket assembly 92 and the gaskets associated therewith, all as is shown in FIG. 1. Should there be a desire or a need to withdraw the gases in the chamber, there is provided exhaust gas port 96 into which a valved line can be fitted.

In addition, lower bellows seal 90, the interior surface of annular wall 66, lower bellows bracket 86 and lower bellows bracket assembly 92 form a space which contains gases, such as the gas which is used to fluidize the material in tube 10. This space along with the open lower end of product withdrawal tube 10 are in gaseous communication with the fluidizing gas which is within space 106 through the opening below numeral 92.

To hold product withdrawal tube 10 in fitment with fluidized bed distributor 12 and to maintain the integrity of the lap joints 24, 36, 38 and 40, a compressive force is applied upwardly along the length of product withdrawal tube 10. This force is provided by means of a plurality of coil springs which are located about the lower end of bottom segment 42. One of these springs is depicted in FIG. 1 and its description is equally applicable to the other springs utilized but not shown in the figure. The number of springs utilized depends upon the force required to be applied to product withdrawal tube 10. Also, the number of springs used and their location should be such that there is an even application of force about the lower end of bottom 42.

Coil spring 98 acts against spring leg 99 which is in fixed relationship with lower bellows bracket assembly 92 which in turn is rigidly affixed to bottom segment collar 44 and thus bottom segment 42. The force exerted by coil spring 98 can be adjusted. Spring adjustment assembly 100 provides for such an adjustment and comprises adjustment bolt 102 which is threaded to threaded bolt bracket 104. Tightening of adjustment bolt 102 results in the application of a greater force to bottom segment 42 whereas loosening of adjustment bolt 102 accomplishes just the opposite result.

The foregoing description of a particular embodiment of this invention is meant to illustrate the invention and not to limit its scope in any way. It will be apparent to those skilled in the art that there are substitutes for the various parts and assemblies described above which can act in the same way to perform the same function so that the same effect is obtained. For example, coil spring 98 could be placed above spring leg 99 so that it urged bottom segment 42 upward by way of tension in the spring rather than compression. The equivalents for other parts and assemblies will become readily apparent and are not to be considered outside the scope of the inventions disclosed herein.

What is claimed is:

1. An assembly comprising (A) a fluidized bed gas distributor, (B) a product withdrawal tube, and (C) a force-applying means; said product withdrawal tube comprising at least two elongated tubular segments which have crystalline silicon inner surfaces and are flexibly and sealingly fitted together to provide a tube having (a) an upper end in abutting and sealing engagement with the fluidized bed gas distributor and (b) a lower end connected to and, which receives from, the force-applying means a force that is substantially parallel to a longitudinal axis of said withdrawal tube and is in a direction towards the fluidized bed distributor.

2. The assembly of claim 1 in combination with a retaining sleeve which is exterior of and substantially coaxial with the longitudinal axis of the product withdrawal tube and which extends over at least a major portion of the length of the product withdrawal tube.

3. The assembly of claim 2 wherein the retaining sleeve is fabricated from graphite.

4. The assembly of claim 1 wherein the segments of the product withdrawal tube are flexibly fitted together by seals comprising a lap joint and gasket; said gasket being positioned so that is does not contact material flowing through the tube.

5. The assembly of claim 4 wherein the gasket is made of graphite.

6. The assembly of claim 1 wherein the product withdrawal tube comprises an upper segment, at least one intermediate segment, and a lower segment.

7. The assembly of claim 6 wherein each segment of the product withdrawal tube has a length of about 0.5–5 feet and the total length of the tube is about 2–10 feet.

8. The assembly of claim 7 wherein each segment of the product withdrawal tube has a length of about 1–3 feet and the total length of the tube is about 4–8 feet.

9. The assembly of claim 8 wherein the segments of the product withdrawal tube are flexibly fitted together by seals comprising a lap joint and gasket; said gasket being positioned so that it does not contact material flowing through the tube.

10. The assembly of claim 9 in combination with a retaining sleeve which is exterior of and substantially coaxial with the longitudinal axis of the product withdrawal tube and which extends over at least a major portion of the length of the product withdrawal tube.

11. The assembly of claim 10 wherein both the gasket and the retaining sleeve are made of graphite.

* * * * *